United States Patent Office 3,449,217
Patented June 10, 1969

3,449,217
PROCESS OF BUFFERING A NEUTRALIZED t-BUTYL HYDROPEROXIDE DURING DISTILLATION
Robert J. Harvey, Teaneck, N.J., assignor to Halcon International Inc., a corporation of Delaware
No Drawing. Filed Jan. 5, 1968, Ser. No. 695,876
Int. Cl. B01d *3/34;* C07c *45/24, 73/00*
U.S. Cl. 203—6                                    7 Claims

ABSTRACT OF THE DISCLOSURE

The present invention is concerned with the recovery of tertiary butyl hydroperoxide from mixtures comprising the tertiary butyl hydroperoxide, tertiary butyl alcohol and organic acids and esters such as result from the liquid phase oxidation of isobutane with minimum hydroperoxide decomposition by distillation procedures during which the effective pH of the liquid is maintained below about 9.

Background of the invention

Tertiary butyl hydroperoxide is a chemical of commerce which finds wide utility mainly as a polymerization initiator. The tertiary butyl hydroperoxide can be prepared from isobutane by liquid phase oxidation of isobutane in acordance with procedures such as those set forth in issued U.S. Patent 2,845,461. The tertiary butyl hydroperoxide produced by such oxidation procedures is generally in admixture with tertiary butyl alcohol which is also produced during the oxidation as well as with other oxidation products including acidic type materials such as formic acid and esters thereof. It is generally desirable to recover the tertiary butyl hydroperoxide from the other components of the oxidation mixture in maximum yield and purity. This is most advantageously accomplished by subjecting the reaction mixture to distillation procedures preferably procedures such as those described in co-pending application Ser. No. 680,298 filed Oct. 24, 1967, by Hoch et al.

A disadvantage encountered in distillations of the isobutane oxidation mixtures is that there tends to occur significant decomposition of the tertiary butyl hydroperoxide and the hydroperoxide product tends to be contaminated for example, with products of decomposition.

Objects of the invention

It is an object of the present invention to provide an improved method for the recovery of tertiary butyl hydroperoxide from mixtures also containing tertiary butanol and organic acids and esters, e.g., isobutane oxidation mixtures, by distillation procedures. It is a further object to provide an improved method whereby decomposition of tertiary butyl hydroperoxide during the distillation is reduced and the tertiary butyl hydroperoxide product purity is significantly improved.

Summary of the invention

In accordance with the present invention, it has now been found that tertiary butyl hydroperoxide can be recovered from mixtures such as isobutane oxidate mixtures by distillation procedures while substantially avoiding hydroperoxide decomposition provided the distillation is carried out in the presence of a material which is capable of maintaining the effective pH of the liquid fraction during the distillation below about 9 and preferably below about 8.

Detailed description of the invention

The liquid phase oxidation of isobutane to produce tertiary butyl hydroperoxide is a known reaction and the details of this oxidation need not be elaborated here. The mixtures which result from this oxidation, on an isobutane free basis, generally comprise by weight about 25 to 75% tertiary butyl hydroperoxide, 20 to 70% tertiary butyl alcohol, and 2 to 20% of other oxidation products of which formic acid in free or esterified form is usually a constituent representing 0.1 to 10% of the total oxidation products. It is such mixtures which are most advantageously treated according to the present invention for the separation and recovery in high yield and purity of the tertiary butyl hydroperoxide, although the invention is generally applicable to mixtures containing the above components prepared in any manner.

In a particularly preferred practice of the invention, the oxidate, after removal of isobutane as by distillation in accordance with known techniques, is contacted with a basic material in order to neutralize the acidic components of this oxidate as provided in copending application Ser. No. 677,756 filed Oct. 24, 1967 of Valbert et al. This neutralization is highly desirable for a number of reasons including the fact that downstream corrosion is substantially minimized by this neutralization. Thus materials of construction which are considerably less expensive than the highly corrosion resistant materials can be employed where the neutralization step is provided. Suitably the oxidate is contacted with sufficient neutralizing material such as sodium hydroxide, calcium hydroxide, barium oxide, potassium carbonate, lithium hydroxide, potassium hydroxide, rubidium hydroxide, cesium hydroxide, magnesium hydroxide, strontium hydroxide, barium carbonate, lithium carbonate, sodium carbonate, rubidium carbonate, cesium carbonate, calcium carbonate, strontium carbonate, magnesium carbonate, and the like, desirably in the form of an aqueous solution to neutralize the acidic components of the oxidate. The neutralization can be carried out at room temperature or at temperatures above or below room temperature, for example, temperatures of 0 to 100° C. In these procedures cation from the neutralization remains in the oxidate.

The oxidate, preferably after the aforesaid neutralization is subjected to a disillation whereby the tertiary butyl hydroperoxide is recovered in high yield and purity. As above mentioned it is the essential aspect of the present invention that this distillation be carried out while regulating the effective pH of the liquid during the distillation such that this pH does not exceed about 9 and most preferably does not exceed about 8. In particularly preferred practices of the invention, the distillation is carried out such that the effective pH of the liquid during distillation is maintained in the range from about 4 to about 9, preferably from 6 to about 8.

The distillation of the tertiary butyl hydroperoxide containing fraction may be carried out in accordance with batch or continuous procedures using one or several separate distillation steps. In batch distillations, it is the pH of the pot liquid which must be regulated by the invention while in continuous distillations it is the pH of at least the bottoms liquid in the column wherein the tertiary butyl hydroperoxide is separated as distillate which must be regulated although preferably the liquid bottoms fractions in all columns in a continuous sequence are so regulated. In a particularly advantageous practice of the invention, the distillation is carried out as described in said copending application of Hoch et al. in the presence of a diluent vapor, preferably steam, in order to avoid problems of explosive decomposition. In a batch system, the distillation is first carried out with the separation of tertiary butyl alcohol overhead, illustratively in the form of an azeotrope with water, followed by the subsequent separation of tertiary butyl hydroperoxide as overhead, preferably also in the form of an azeotrope with water. In continuous systems, it is advantageous to use two distillation columns with the tertiary butyl alcohol as overhead product in the first column and the tertiary butyl hydroperoxide as overhead in the second column.

The distillation is generally carried out while maintaining temperature of the liquid during distillation within the broad range of about −10° C. to about 140° C. and preferably at temperatures ranging from about 40° C. to about 120° C. most preferably 50 to 85° C. Although atmospheric pressures can be employed during the distillation it is exceedingly advantageous that the distillation be conducted under conditions of reduced pressure. The use of these reduced pressures permits operation with lower liquid phase temperatures, which lower temperatures distinctly favor recovery of maximum yields of tertiary butyl hydroperoxide product.

As previously indicate, it is essential in accordance with the present invention that the effective pH of the liquid phase present during the distillation be maintained within the prescribed range. By the term "effective pH" as used herein is meant the actual pH of the liquid phase in the event that this liquid phase represents an aqueous solution or alternatively with liquid phase that is not an aqueous solution the term refers to the pH of the water phase formed upon admixing the actual distillation liquid phase with an equal volume of water.

It has been found with isobutane oxidate mixtures, even though neutralized to a pH of 7, that during the distillation thereof to recover the tertiary butyl hydroperoxide there occurs a marked increase in the pH of the pot or bottoms liquid during the distillation which is accompanied by the loss through decomposition of tertiary butyl hydroperoxide and a contamination of product. It is believed that the pH rise is caused by the presence of cation from the neutralization products in the distillation liquid upon the oxidation of formate during the distillation.

In accordance with the invention, the pH of the liquid phase is maintained by incorporating therein materials of the type generally known as buffers, that is, materials which are capable of reacting with basic or acidic materials formed during the distillation in order to stabilize the effective pH of the liquid phase. It is an essential aspect of the present invention that such buffering materials are incorporated in the liquid phase prior to or during the distillation. Examples of suitable buffers are: $NaH_2PO_4$, $KH_2PO_4$, alone or in admixture with one or more of $Na_2HPO_4$, $K_2HPO_4$ or $(NH_4)_2HPO_4$. Other buffer systems which could be used in this process include the following:

The combination of potassium hydrogen phthalate with NaOH as for example, a mixture of 50 ml. of 0.1 molar potassium hydrogen phthalate+22.6 to 43.7, preferably 36.6 to 43.7 ml. of 0.1 molar NaOH.

The combination of potassium dihydrogen phosphate and NaOH as, for example, a mixture of 58 ml. of 0.1 molar potassium dihydrogen phosphate+3.6 to 46.1, preferably 13.9 to 32.1 ml. of 0.1 molar NaOH.

The combination of tris (hydroxymethyl) aminoethane and HCl as, for example, a mixture of 50 ml. of tris (hydroxymethyl) aminoethane+46.6 to 7.0, preferably 46.6 to 29.2 ml. of 0.1 molar HCl.

However, the invention is not limited to those systems cited, and encompasses all buffer systems or reagents which will maintain the liquid effective pH of between 4 and 9 during the course of the distillation. The amount of buffer which is employed should be sufficient to maintain the pH within the desired range during the distillation. Generally amounts of buffer in the range of 2 to 20% by weight of the oxidate are preferred.

As an alternative to adding buffering agents, it is possible to neutralize the isobutane oxidate in such a way that there is provided an indigenous buffering system. If the oxidate is contacted with an alkaline material in an amount such that only from about ¼ to ½ of the acidic materials present in the oxidate are neutralized, an internal buffer system which is believed to represent a formate-formic acid buffer system is formed which will effectively maintain the pH of the distillation mixture within the prescribed range during the distillation.

The following examples will illustrate the invention:

EXAMPLE 1

Isobutane is continuously oxidized in the liquid phase with air at a temperature of about 137° C. and at a pressure of about 450 p.s.i.a. A mixture of unreacted isobutane and reaction products representing about 35% conversion of isobutane is continuously withdrawn and isobutane is continuously added at rate sufficient to maintain substantially steady state conditions.

Unreacted isobutane is separated overhead (actually in stages) from the reaction products by distillation to a final pot temperature of 94° C. and 967 mm. Hg. The remaining reaction mixture contains by weight about 51% tertiary butyl hydroperoxide, 41% tertiary butyl alcohol, 1% formic acid, 0.2% formate esters, and the remainder other oxidation products including acetone, methanol, carbon dioxide, acetic acid, water and the like.

500 grams of the oxidation product mixture is neutralized with 0.5 N NaOH until the neutralized mixture has a pH of 7. The neutralized mixture is diluted with additional water to a total weight of 1,000 grams, and to this diluted mixture is added 10.9 grams of $KH_2PO_4$ and the resulting solution is charged to a 2 liter distillation pot under a 20 plate Oldershaw topped with a magnetic reflux ratio head.

The solution is distilled at 154 mm. Hg and a reflux ratio of 5:1. The pot temperature ranges from 57 to 66° C. with a tertiary butyl alcohol-water azeotrope first being recovered at a head temperature of 49° C. followed subsequently by the recovery of a tertiary butyl hydroperoxide-water azeotrope at 59° C. After a total distillation time of 6 hours, 96% of the tertiary butyl hydroperoxide initially charged is recovered. The pH of the pot liquid averages about 6.8 during the distillation, the final pH being 8.0. The tertiary butyl hydroperoxide-water overhead azeotrope is condensed and phase separated into an upper phase containing 70% by weight tertiary butyl hydroperoxide and a lower phase containing 15% tertiary butyl hydroperoxide which could, if desired, be recycled.

Comparative Example A

Example 1 is repeated except that no buffer is added to the neutralized oxidation product mixture and about 89% of the tertiary butyl hydroperoxide is recovery by the distillation. The pH of the pot liquid averaged about 7.8 during the distillation but was over 9 at the end. This clearly illustrates the importance of maintaining the pH of the liquid during distillation as specified in accordance with the present invention.

EXAMPLE 2

Example 1 was repeated except that the buffer added is 27.2 grams of $KH_2PO_4$ and 53.6 grams of $$Na_2HPO_4 \cdot 7H_2O$$

About 98.2% of the tertiary butyl hydroperoxide charged is recovered during the distillation, the average pH of the pot liquid during the distillation is 6.1 and the final pH is 6.1.

Comparative Example B

Example 1 is repeated except that no buffer is added and the distillation is carired out at atmospheric pressure. The reflux ratio is 5:1 and the pot temperature ranges from 91 to 104° C. The tertiary butyl alcohol-water azeotrope is removed at a head temperature of 79° C. and a tertiary butyl hydroperoxide-water azeotrope comes overhead at a temperature of 93° C. After a total distillation time of 6 hours, 71% of the tertiary butyl hydroperoxide is recovered. The average pot liquid pH during the course of the distillation is 9.0 with the final pH being about 11.

EXAMPLE 3

Comparative Example B is repeated except that the neutralized oxidation mixture is buffered by the addition of 27.2 grams of $KH_2PO_4$ and 53.6 grams of $$Na_2HPO_4 \cdot 7H_2O$$

At the same distillation conditions as in comparative example B 90% of the tertiary butyl hydroperoxide is recovered overhead and the average pH of the pot liquid during the distillation is 6.6, the final pH being 7.5.

EXAMPLE 4

Comparative Example B is repeated except that the amount of NaOH employed in the neutralization is sufficient only to neutralize one half of the organic acid content of the oxidation mixture as determined by standard titration procedures. No additional buffers are added and the neutralized mixture is distilled as described in comparative Example B. About 90% of the tertiary butyl hydroperoxide is recovered overhead and the pot liquid pH during the distillation averages about 6.8. The final pot liquid pH is about 8. This example illustrates the formation of an internal buffered system by the partial neutralization of the acid contained in the oxidation product mixture.

EXAMPLE 5

Comparative Example B is repeated except that the neutralized solution is buffered by the addition of 27.2 grams of $KH_2PO_4$. Upon distillation as described in comparative Example B, 89% of the tertiary butyl hydroperoxide is recovered overhead and the pot liquid pH during the distillation averages about 6.4. The final pot liquid pH is 7.8.

EXAMPLE 6

An oxidation reaction mixture is prepared as described in Example 1. 500 grams of the oxidation products are diluted with an added 500 grams of water and to this solution there is added 15.1 grams of $K_2HPO_4$. After agitating the mixture, 15.1 g. of $KH_2PO_4$ is added. The resulting solution is distilled as described in comparative Example B with the recovery of 89% of the tertiary butyl hydroperoxide overhead. The pH of the pot liquid during the distillation averages about 6.6 with the final pH being 8.0. This example illustrates that the pH can be controlled with buffer alone.

I claim:
1. In a process for the separation of tertiary butyl hydroperoxide from isobutane oxidation mixture by distillation wherein the isobutane oxidation mixture has been at least partially neutralized prior to the distillation by addition of an alkaline material thereto, the improvement which comprises incorporating a chemical buffer in the feed to the distillation so as to maintain the effective pH of the liquid during distillation below about 9.

2. The method of claim 1 wherein the effective pH is maintained in the range 4 to 9.

3. The method of claim 1 wherein the effective pH is maintained in the range 6 to 8.

4. A process in accordance with claim 1 wherein the feed is only partially neutralized prior to distillation by addition of less than the stoichiometric amount of alkaline material needed for neutralization of acidic components in the isobutane oxidation mixture, thereby forming a chemical buffer in situ.

5. A process in accordance with claim 1 wherein a chemical buffer is added to the isobutane oxidation mixture.

6. A process in accordance with claim 5 wherein the buffer is selected from at least one member of the group consisting of alkali metal hydrogen phosphates, alkali metal dihydrogen phosphates, alkali metal hydrogen phthalates conjointly with alkali metal hydroxides, carbonates or bicarbonates and tris (hydroxymethyl) aminoethane conjointly with a mineral acid.

7. A process in accordance with claim 1 wherein the amount of buffer employed is between 2% and 20% by weight of the isobutane oxidation mixture.

References Cited

UNITED STATES PATENTS

| | | |
|---|---|---|
| 2,383,919 | 8/1945 | Rust. |
| 2,491,732 | 12/1949 | Hawkinson et al. _____ 203—6 |
| 2,520,870 | 8/1950 | Wood et al. _____ 203—6 |
| 2,527,640 | 10/1950 | Lorand et al. |
| 2,573,947 | 11/1951 | Bell et al. |
| 2,845,461 | 7/1958 | Winkler et al. |

FOREIGN PATENTS

| | | |
|---|---|---|
| 1,225,645 | 9/1966 | Germany. |

WILBUR L. BASCOMB, JR., *Primary Examiner.*

U.S. Cl. X.R.

203—63, 7, 33, 34, 35, 36, 37, 38, 51, 92; 260—610